Nov. 9, 1926.
F. PAULSON
ARTIFICIAL BAIT
Filed Oct. 16, 1925
1,606,176
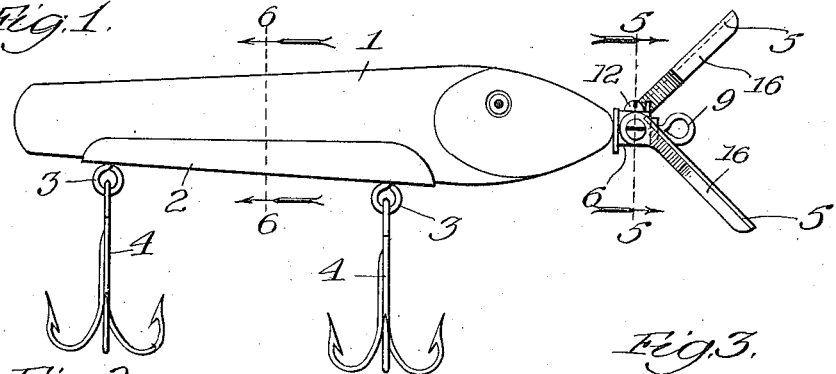
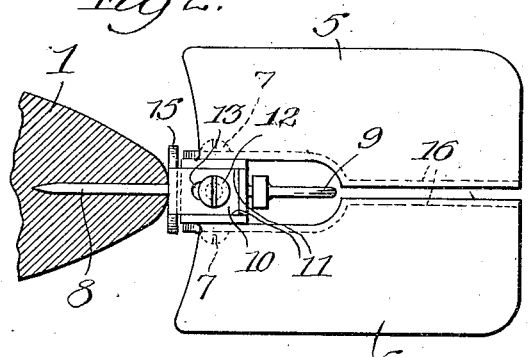
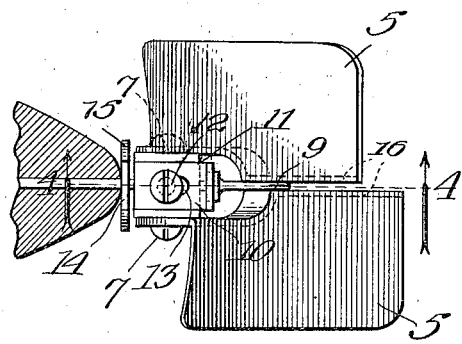
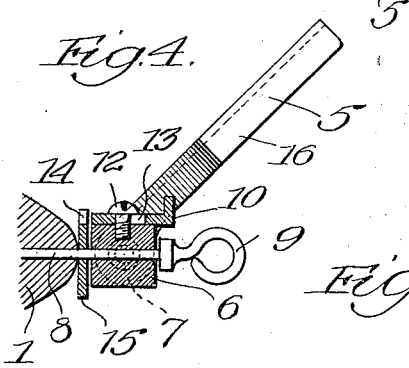
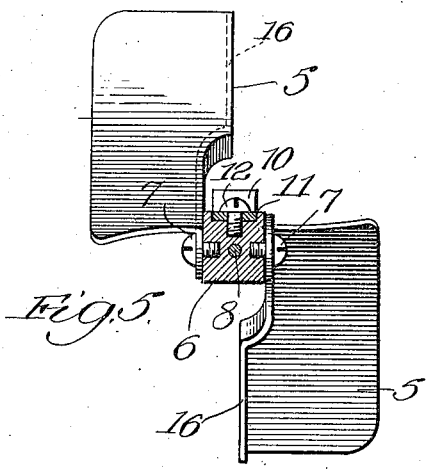
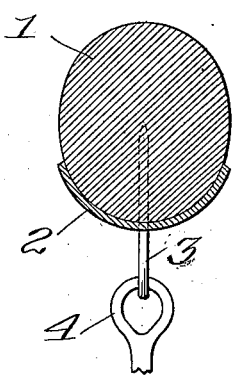
Inventor:
Fred Paulson, Patented Nov. 9, 1926.

1,606,176

UNITED STATES PATENT OFFICE.

FRED PAULSON, OF GENEVA, ILLINOIS.

ARTIFICIAL BAIT.

Application filed October 16, 1925. Serial No. 62,713.

This invention relates to artificial baits of the kind covered by my prior Patent No. 1,542,404, granted June 16, 1925, wherein a pair of independently adjustable wings or vanes are carried at the forward end of the bait for controlling the movements thereof as it is drawn through the water.

The main object of my present invention is to rotatably mount the wings on the body so that said wings or vanes will spin or revolve as drawn through the water with the body.

Another object of my invention is to provide latch means for the vanes or wings for locking the same against spinning or rotation when desired.

The invention consists further in the matters hereinafter described and claimed.

In the accompanying drawings—

Fig. 1 is a side view of an artificial bait embodying the features of my invention;

Fig. 2 is an enlarged top plan view of the front end of the bait showing the wings or vanes and their rotatable mounting;

Fig. 3 is a similar view showing the block unlocked for rotation;

Figs. 4 and 5 are transverse and longitudinal vertical sectional views, respectively, on lines 4—4 of Fig. 3 and 5—5 of Fig. 1; and Fig. 6 is a vertical sectional view through the plug on line 6—6 of Fig. 1.

In the drawings, 1 indicates the body or plug of the bait. This plug may be made of wood or other buoyant material and be shaped and finished as required for artificial bait purposes. A polished plate 2 of metal is applied to the under side of the plug 1 for attracting fish. This plate extends lengthwise of the plug and is secured thereto adjacent its ends by screw eyes 3, 3, from which gang hooks 4, 4 are suspended, as shown in Figs. 1 and 6.

At the front end of the plug 1, I provide a pair of vanes or wings 5, 5 for controlling the movement of the bait as it is drawn through the water. The wings or vanes 5 are on opposite sides of a block 6 and are pivotally secured thereto by screws 7, 7. Said screws permit the wings or vanes 5, 5 to be adjusted independently into different angular positions with respect to each other and to the body for making a diving bait, a wiggling bait, a skipping bait, an ordinary surface bait, or a spinning bait, as covered by my prior patent as aforesaid.

An axis member 8 is driven into the forward end of the plug 1 and has a hook or eye 9 at its outer end for attachment to a line. The member 8 extends beyond the plug 1 and the block 6 is rotatably mounted thereon between the eye 9 and the plug, as shown in Figs. 2 to 5. When the wings 5 are adjusted to diverging positions, as shown in Fig. 1, said wings or vanes 5 will spin or revolve with the block 6 as the bait is drawn through the water. The speed of rotation or the rate of spinning of the wings and block may be controlled by clamping the wings in different angular positions by the screws 7 which are at right-angles to the member 8. By having the vanes spin, the bait will have the effect of being animated and thus serve to better attract fish.

The block 6 may be held against rotation whenever desired by a latch member 10 carried thereby, as shown in the drawings. The latch member 10 is slidably mounted in a groove or guide-way 11 in the block between the vanes, as clearly shown in Figs. 2 to 5. A screw 12 passing through an elongated slot 13 in the latch 10 holds the same in this groove.

The forward end of the latch 10 is bent outward to provide a grasping flange whereby the latch may have its inner end slid into and out of a notch 14 in a disc 15 fixed against rotation at the forward end of the plug 1 and held thereon by the member 8, as shown. As shown in Fig. 4, the inner end of the latch 10 will not strike the disc when the latch is held in unlocked position by tightening its screw 12.

As shown in Fig. 2, the vanes or wings 5, 5 are positioned in the same plane. The inner side edges of these wings are cut away to receive the block 6 and clear the eye 9 where the forward portions of the wings come close together. The wings are reinforced or strengthened by flanges 16, 16 along their inner edges and following the contour thereof, as shown.

The details of structure shown and described may be variously modified and changed without departing from the spirit and scope of my invention.

I claim as my invention:

1. An artificial bait having a body, hooks thereon, a pair of diverging vanes at the forward end of said body, means rotatably connecting the vanes to said body whereby the vanes may spin on being drawn through the water with the body, and latch means for holding the vanes from spinning when desired.

2. An artificial bait having a body, hooks thereon, a pair of vanes at the forward end of said body and being independently adjustable to different angles thereto, means for rotatably connecting the vanes to the body whereby the vanes may spin on being drawn through the water with the body, and latch means for holding the vanes from spinning when desired.

3. An artificial bait having a body, hooks thereon, an axis member at the forward end of the body, a block rotatably mounted on said member, and a pair of diverging vanes carried by the block on opposite sides thereof.

4. An artificial bait having a body, hooks thereon, an axis member at the forward end of said body, a block rotatably mounted on said member, and a pair of vanes carried by the block on opposite sides thereof, said vanes being pivotally connected with the block for independent adjustment to different angles to said member.

5. An artificial bait having a body, hooks thereon, an axis member at the forward end of said body, a block rotatably mounted on said member, a pair of vanes carried by the block on opposite sides thereof, a non-rotatable disc on said member adjacent said block and having a notch therein, and a latch slidable on the block and engageable with said notch for holding the block against rotation when desired.

In testimony whereof I affix my signature this 10th day of October, 1925.

FRED PAULSON.